(12) United States Patent
Sang et al.

(10) Patent No.: US 12,437,085 B2
(45) Date of Patent: Oct. 7, 2025

(54) ENCRYPTED SEAL, AND SECONDARY ENCRYPTION METHOD FOR STRIP-SHAPED DATA

(71) Applicant: MATRIXNETS TECHNOLOGY CO., LTD., Hebei (CN)

(72) Inventors: Haiming Sang, Hebei (CN); Ge Gan, Hebei (CN)

(73) Assignee: MATRIXNETS TECHNOLOGY CO., LTD., Hebei (CN)

( * ) Notice: Subject to any disclaimer, the term of this patent is extended or adjusted under 35 U.S.C. 154(b) by 0 days.

(21) Appl. No.: 18/292,830

(22) PCT Filed: Jun. 27, 2022

(86) PCT No.: PCT/CN2022/101405
§ 371 (c)(1),
(2) Date: Sep. 23, 2024

(87) PCT Pub. No.: WO2023/005544
PCT Pub. Date: Feb. 2, 2023

(65) Prior Publication Data
US 2025/0028841 A1    Jan. 23, 2025

(30) Foreign Application Priority Data

Jul. 26, 2021    (CN) .......................... 202110845169.7

(51) Int. Cl.
*G06F 21/60* (2013.01)
*G06F 21/62* (2013.01)

(52) U.S. Cl.
CPC ........ *G06F 21/602* (2013.01); *G06F 21/6209* (2013.01)

(58) Field of Classification Search
CPC .......................... G06F 21/602; G06F 21/6209
See application file for complete search history.

(56) References Cited

U.S. PATENT DOCUMENTS

| 6,401,206 B1 | 6/2002 | Khan et al. |
| 6,442,276 B1 * | 8/2002 | Doljack ............... G07D 7/0043 705/28 |

(Continued)

FOREIGN PATENT DOCUMENTS

| CN | 1267025 A | 9/2000 |
| CN | 1379352 A | 11/2002 |

(Continued)

*Primary Examiner* — Vance M Little
(74) *Attorney, Agent, or Firm* — MUNCY, GEISSLER, OLDS & LOWE, P.C.

(57) ABSTRACT

An encrypted seal and a double encryption method of bar-shaped data, wherein the encrypted seal includes a graphic text area, a seal frame, and a bar-shaped digital encryption area, wherein both the graphic text area and the bar-shaped digital encryption area are arranged within the seal frame, inside the bar-shaped digital encryption area is filled an encrypted code, the encrypted code records stamped information of a stamped file, different stamped files correspond to different encrypted codes, and the bar-shaped digital encryption area is arranged in a blank area between the graphic text area and the seal frame; the double encryption method of bar-shaped data comprises steps of obtaining a barcode or a character string to be processed, splitting the barcode or the character string to be processed, and re-splicing two code fragments with missing information.

24 Claims, 5 Drawing Sheets

(56) References Cited

U.S. PATENT DOCUMENTS

| | | | |
|---|---|---|---|
| 2001/0025272 A1* | 9/2001 | Mori | G06K 19/06037 |
| | | | 713/180 |
| 2005/0036651 A1* | 2/2005 | Wen | G06T 1/0028 |
| | | | 382/100 |
| 2018/0359228 A1 | 12/2018 | Lerner | |
| 2019/0080127 A1* | 3/2019 | Yoshida | G06F 3/04162 |

FOREIGN PATENT DOCUMENTS

| CN | 101329750 A | 12/2008 |
|---|---|---|
| CN | 104647924 A | 5/2015 |
| CN | 106682479 A | 5/2017 |
| CN | 107147616 A | 9/2017 |
| CN | 109376831 A | 2/2019 |
| CN | 109754045 A | 5/2019 |
| CN | 111639356 A | 9/2020 |
| CN | 113486997 A | 10/2021 |
| CN | 113592694 A | 11/2021 |

* cited by examiner

ENCRYPTED SEAL, AND SECONDARY ENCRYPTION METHOD FOR STRIP-SHAPED DATA

TECHNICAL FIELD

The present invention relates to the technical field of seal anti-counterfeiting, and in particular to an encrypted seal and a double encryption method of bar-shaped data.

BACKGROUND TECHNOLOGY

A company's seal serves as proof of the company's identity and authority. Documents stamped with a company's seal are legally protected and meanwhile signify that the company bears legal responsibility for contents of the documents. If a company's seal is stolen or forged, it could likely lead to unnecessary disputes and liabilities that the company cannot bear.

Currently, for most existing seals textures on seal frames and anti-counterfeiting fonts are used on seals to prevent forgery. However, seals made in such way are relatively prone to being counterfeited. Moreover, most existing seals cannot record information about stamped files, making it very difficult to verify authenticity of both stamped files and seals themselves.

SUMMARY OF THE INVENTION

The present invention provides an encrypted seal and a double encryption method of bar-shaped data, so as to solve problems existing in the prior art.

In order to solve technical problems above, the present invention provides following specific technical solutions: an encrypted seal comprises a graphic text area, a seal frame, and a bar-shaped digital encryption area, wherein both the graphic text area and the bar-shaped digital encryption area are arranged within the seal frame, inside the bar-shaped digital encryption area is filled an encrypted code, the encrypted code records stamped information of a stamped file, different stamped files correspond to different encrypted codes, and the bar-shaped digital encryption area is arranged in a blank area between the graphic text area and the seal frame.

Preferably, the seal frame comprises but is not limited to round, oval and square shapes.

Preferably, the encrypted code comprises but is not limited to a changeable and identifiable code formed by graphics, digits, alphabets, symbols or combinations thereof.

Preferably, the encrypted code comprises a barcode or a character string for double encryption, which is used to perform double encryption on the encrypted seal.

Preferably, the barcode comprises a bar-shaped code or a combination of a bar-shaped code and any other encryption graphic, and the character string comprises digits, alphabets, or a combination of digits and alphabets.

Preferably, double encryption comprises:
obtaining a barcode or a character string to be processed, which comprises obtaining pixel information of the barcode or the character string to be processed;
splitting the barcode or the character string to be processed, which comprises randomly or fixedly selecting a position on the barcode or the character string to be processed as a split point, recording location information of the split point, splitting the barcode or the character string to be processed into a first fragment and a second fragment to form two code fragments with missing information, wherein a front end of the first fragment comprises a code head of the barcode or the character string to be processed, and a rear end of the second fragment comprises a code tail of the barcode or the character string to be processed; and
re-splicing the two code fragments with missing information, which comprises exchanging positions of the first fragment and the second fragment, namely, splicing the rear end of the second fragment with the front end of the first fragment to form the barcode or the character string double encrypted.

Preferably, the split point is randomly selected.

Preferably, within the seal frame is further provided a check area for setting encrypted information, the encrypted information comprises the location information of the split point, and the check area is set in a blank area within the seal frame.

Preferably, the check area comprises a correction bit, a check bit and a display bit;
the correction bit is provided with the encrypted information, and the encrypted information comprises the location information of the split point, which is used to correct the barcode or the character string double encrypted;
the check bit is provided with verification information, which is used to check whether a length of the encrypted code is accurate;
the display bit is provided with information on a quantity of times of stamping which is used to display how many times the encrypted seal has been stamped.

Preferably, the split point is selected fixedly.

Preferably, the encrypted seal further comprises a start symbol located at a preset position.

Preferably, an extension line of a start symbol and seal center connection line intersects the bar-shaped digital encryption area, and an intersection point of the extension line and the bar-shaped digital encryption area is used as the split point Preferably, the start symbol comprises characters or graphics in the graphic text area.

Preferably, the start symbol comprises a preset point on the seal frame.

Preferably, the encrypted code comprises a bar-shaped code or a combination of a bar-shaped code and any other encrypted graphics.

Preferably, "splitting the barcode or the character string to be processed" further comprises:
determining a position of the split point based on the pixel information and the location information of the split point;
if the split point locates at a vertical bar of the bar-shaped code, moving the split point to a first blank position behind or in front of the vertical bar, and splitting the barcode or the character string to be processed again, and adding a vertical bar to the front end of the second fragment or the rear end of the first fragment; and
if the split point locates in a blank space of the bar-shaped code, directly splitting the barcode or the character string to be processed, and adding a vertical bar to the front end of the second fragment or the rear end of the first fragment.

Preferably, "re-splicing the two code fragments with missing information" further comprises:
setting a blank bar between the second fragment and the first fragment, wherein a width of the blank bar is an integer multiple of a narrowest blank width of the bar-shaped code, and does not exceed a width of a widest blank in the bar-shaped code; and then performing splicing again in an order of the second fragment, the blank bar, and the first fragment.

Preferably, the encrypted code comprises a character string, and the character string comprises digits or alphabets or a combination of digits and alphabets.

Preferably, "splitting the barcode or the character string to be processed" further comprises:
  determining a position of the split point based on the pixel information and the location information of the split point;
  if the split point locates at a certain character of the character string, then incorporating the certain character of the character string at which the split point locates into the first fragment or into the second fragment; and
  if the split point locates in a blank space between two characters of the character string, directly splitting the barcode or the character string to be processed.

Preferably, the encrypted code is arranged along the seal frame in an arc shape, a bar shape or any other shape which is convenient for identification.

Preferably, the encrypted seal comprises one or a combination of red, blue, black and other various colors.

Preferably, forms of the stamped files comprise but are not limited to electronic forms and material object forms.

Preferably, the stamped files comprise but are not limited to electronic or paper documents, contracts, bills, pictures, calligraphy and paintings, documents, certificates, instructions, user guides and product packaging.

Preferably, material object forms comprise but are not limited to outputting the encrypted seal to various physical objects such as paper materials, textile materials, leather materials, wooden materials, chemical materials, ceramic materials, metal materials, glass materials, etc.

Compared to existing technology, the present invention has following beneficial effects: the encrypted seal of the present invention records stamped information by setting an encrypted code in a bar-shaped digital encryption area, making it convenient to check and verify the authenticity of stamped files, and each different stamped file corresponds to a different encrypted code, which effectively preventing counterfeiting of seals.

The present invention further provides a double encryption method of bar-shaped data comprising:
  obtaining data to be encrypted, which comprises obtaining pixel information of the data to be encrypted;
  splitting the data to be encrypted, which comprises randomly or fixedly selecting a position on the data to be encrypted as a split point, recording location information of the split point, splitting the data to be encrypted into a front data fragment and a rear data fragment to form two code fragments with missing information; and
  re-splicing the two code fragments with missing information, which comprises exchanging positions of the front data fragment and the rear data fragment, namely, splicing a rear end of the rear data fragment with a front end of the front data fragment to form double encrypted data.

Preferably, the bar data comprises changeable and identifiable encrypted data formed by graphics, digits, alphabets, symbols or combinations thereof.

The present invention further provides a digital file, and the digital file comprises the encrypted seal as mentioned above.

Preferably, the digital file comprises but is not limited to electronic documents, contracts, bills, pictures, calligraphy and paintings, documents, certificates, instructions, user guides and product packaging.

BRIEF DESCRIPTION OF THE DRAWINGS

To provide a clearer illustration of embodiments or technical solutions in the present invention or existing technology, a brief introduction to the drawings required in the description of the embodiments or existing technology is as follows. Obviously, the drawings in the following description are only some embodiments of the present invention. For those of ordinary skill in the art, other drawings can be obtained based on these drawings without exerting any creative effort.

The markups in the drawings are indicated as follows:
  110—graphic text area;
  120—seal frame;
  130—bar-shaped digital encryption area;
  131—first fragment;
  132—second fragment;
  133—blank bar;
  140—check area;
  150—start symbol and seal center connection line;
  160—extension line;
  a—correction bit;
  b—check bit; and
  c—display bit.

SPECIFIC EMBODIMENTS

Principles and features of the present invention are described below with reference to the accompanying drawings. The examples cited are only used to explain the present invention and are not intended to limit the scope of the present invention.

Embodiment 1

Figure 2:
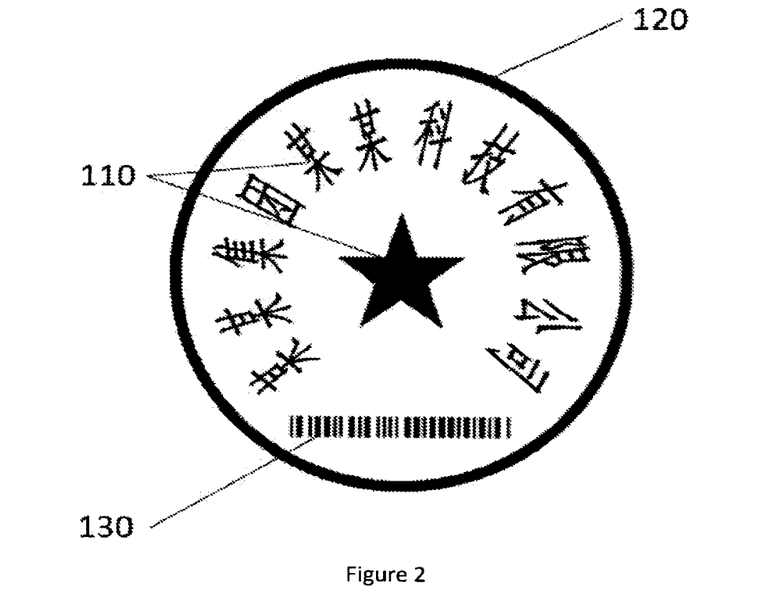
FIG. 2 is a schematic diagram of an encrypted seal without a check area in embodiment 1.

As shown in FIG. 2, an encrypted seal offered by the present invention comprises round, oval and square shapes, the present embodiment adopts a round seal frame, and the present embodiment provides an encrypted seal, comprising a graphic text area 110, a seal frame 120, and a bar-shaped digital encryption area 130, wherein both the graphic text area 110 and the bar-shaped digital encryption area 130 are arranged within the seal frame 120, inside the bar-shaped digital encryption area 130 is filled an encrypted code; further, the bar-shaped digital encryption area in the present embodiment is of a long bar shape, when a stamping request is received, the encrypted code is generated, stamp information of a stamped file is loaded into the encrypted code, different stamped files correspond to different encrypted codes, and further, the bar-shaped digital encryption area 130 is arranged in a blank area between the graphic text area 110 and the seal frame 120.

Figure 3:
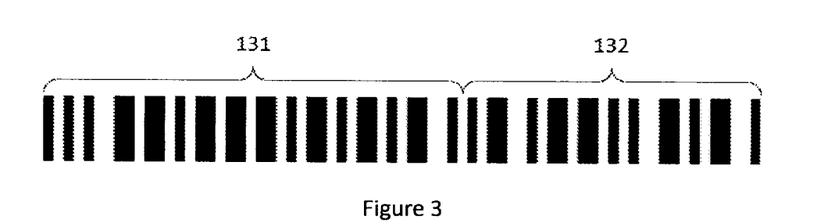
FIG. 3 is an original image showing a bar-shaped code to be processed in an encrypted seal of embodiment 1.
Figure 4:
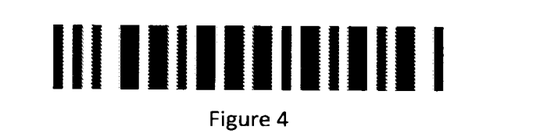
FIG. 4 shows a first bar-shaped code fragment in embodiment 1.
Figure 5:
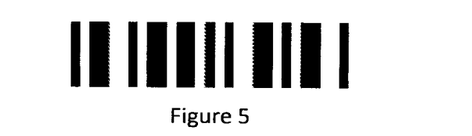
FIG. 5 shows a second bar-shaped code fragment in embodiment 1.
Figure 6:
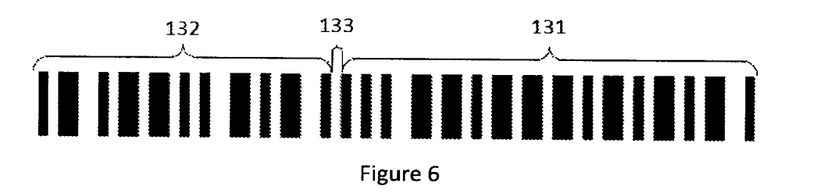
FIG. 6 shows a re-spliced bar-shaped code after splitting in embodiment 1.

The encrypted code of the present invention comprises but is not limited to a changeable and identifiable code formed by graphics, digits, alphabets, symbols or combinations thereof. In the present embodiment, as shown in FIG. 2, the encrypted code adopted is a bar-shaped code, and the bar-shaped code is subjected to double encryption before being filled into the bar-shaped digital encryption area 130, and a process of generating the bar-shaped code and preforming double encryption is as follows:

generating a bar-shaped code, as shown in FIG. 3, wherein the bar-shaped code is generated based on stamp information of a stamped file, and the bar-shaped code in the present embodiment comprises 27 vertical bars;

obtaining a bar-shaped code to be processed, which comprises obtaining pixel information of the bar-shaped code to be processed;

splitting the bar-shaped code to be processed, which comprises randomly selecting a position on the bar-shaped code to be processed as a split point, wherein the split point randomly selected in the present embodiment locates between a $16^{th}$ vertical bar and a $17^{th}$ vertical bar, as shown in FIGS. 4 and 5, the bar-shaped code in FIG. 3 is split into a first fragment 131 and a second fragment 132 to form two code fragments with missing information, a front end of the first fragment 131 is a code head of the bar-shaped code, and a rear end of the second fragment 132 is a code tail of the bar-shaped code; and re-splicing the two code fragments with missing information as shown in FIG. 6, which comprises exchanging positions of the first fragment 131 and the second fragment 132, setting a blank bar 133 with a same width as a narrowest width of a barcode blank between the second fragment 132 and the first fragment 131, and performing splicing again in an order of the second segment 132, the blank bar 133, and the first segment 131 to form a bar-shaped code double encrypted. Since the rear end of the second fragment and the front end of the first fragment are all vertical bars, if directly spliced, information will be lost or a bar-shaped code spliced cannot be parsed.

Through the above-mentioned double encryption process, the security of the bar-shaped digital encryption area is higher, and the encrypted seal is used more safely.

The above bar-shaped code double encrypted is filled into the bar-shaped digital encryption area to form a double encrypted seal.

Figure 1:
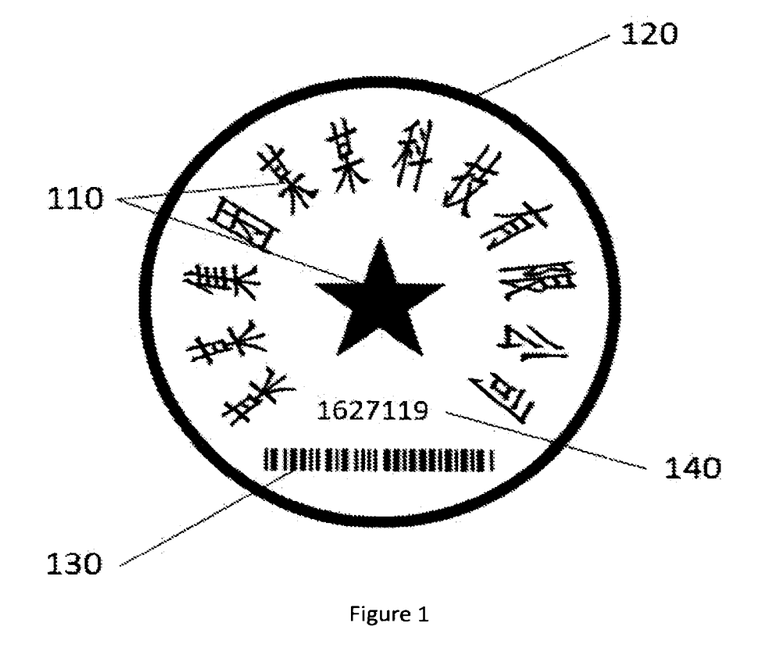
FIG. 1 is a schematic diagram of an encrypted seal in embodiment 1.

As shown in FIG. 1, inside the round seal frame 120 of the present embodiment is further provided a check area 140 for setting encrypted information, the encrypted information comprises location information of the split point, and the check area 140 is set in a blank area within the round seal frame 120.

Figure 7:
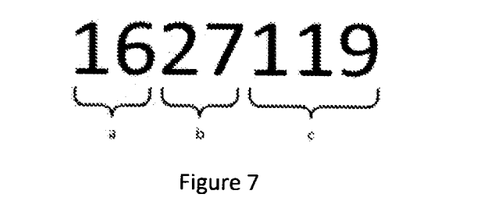
FIG. 7 is a schematic diagram of a check area in embodiment 1.

Specifically, as shown in FIG. 7, the check area 140 comprises a correction bit a, a check bit b and a display bit c, and in the present embodiment the check area 140 uses a combination of digits:

the correction bit a is provided with the encrypted information, namely quantity of vertical bars within a range from the split point selected of the encrypted information to a first vertical bar of a head code of original bar-shaped code, and the correction bit a of the present embodiment shows 16;

the check bit b is provided with verification information, and in the present embodiment, the check bit b shows 27 which is a total quantity of vertical bars in the bar-shaped code;

the display bit c is provided with information on quantity of times of stamping, in the present embodiment the display bit c shows 119, indicating that the encrypted seal is stamped for a $119^{th}$ time.

In addition, in the present embodiment the "splitting the barcode or the character string to be processed further comprises:

determining a position of the split point based on the pixel information and the location information of the split point;

if the split point locates at a vertical bar of the bar-shaped code, moving the split point to a first blank position behind or in front of the vertical bar, and splitting the barcode or the character string to be processed again, and adding a vertical bar to the front end of the second fragment 132 or the rear end of the first fragment 131;

if the split point locates in a blank space of the bar-shaped code, directly splitting the barcode or the character string to be processed, and adding a vertical bar to the front end of the second fragment 132 or the rear end of the first fragment 131.

The above operations ensure the integrity of the information when the bar-shaped code is split and spliced.

Further, the encrypted seal of the present embodiment comprises one or a combination of red, blue, black and other various colors.

Further, in the present embodiment forms of the stamped files comprise but are not limited to electronic forms and material object forms.

Further, the encrypted seal of the present embodiment, wherein the stamped files comprise but are not limited to electronic or paper documents, contracts, bills, pictures, calligraphy and paintings, documents, certificates, instructions, user guides and product packaging.

Further, the encrypted seal of the present embodiment, wherein material object forms comprise but are not limited to outputting the encrypted seal to various physical objects such as paper materials, textile materials, leather materials, wooden materials, chemical materials, ceramic materials, metal materials, glass materials, etc.

Embodiment 2

Figure 8:
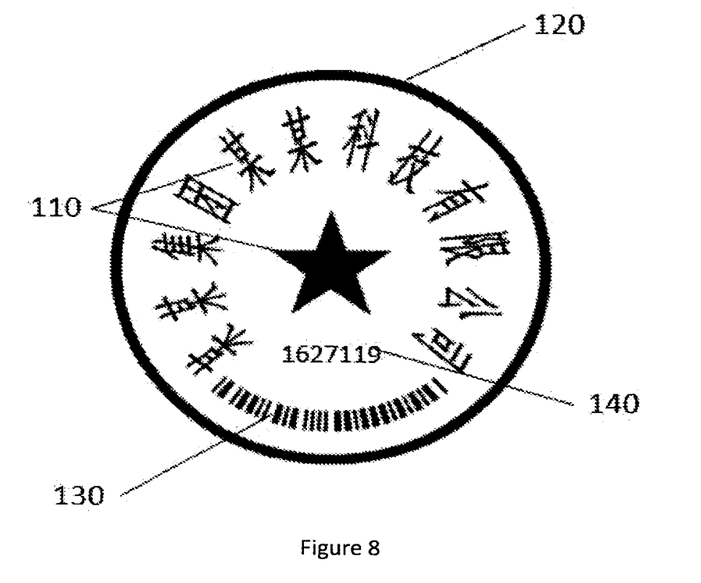
FIG. 8 is a schematic diagram of an encrypted seal in embodiment 2.

As shown in FIG. 8, differences between embodiment 1 and the present embodiment lie in that in the present embodiment an arc-shaped digital encryption area is adopted, and a seal frame 120 of the encrypted seal is arranged in an arc shape within the arc-shaped digital encryption area, which meets different needs of various customers for shape vision of encryption areas.

Embodiment 3

Figure 10:
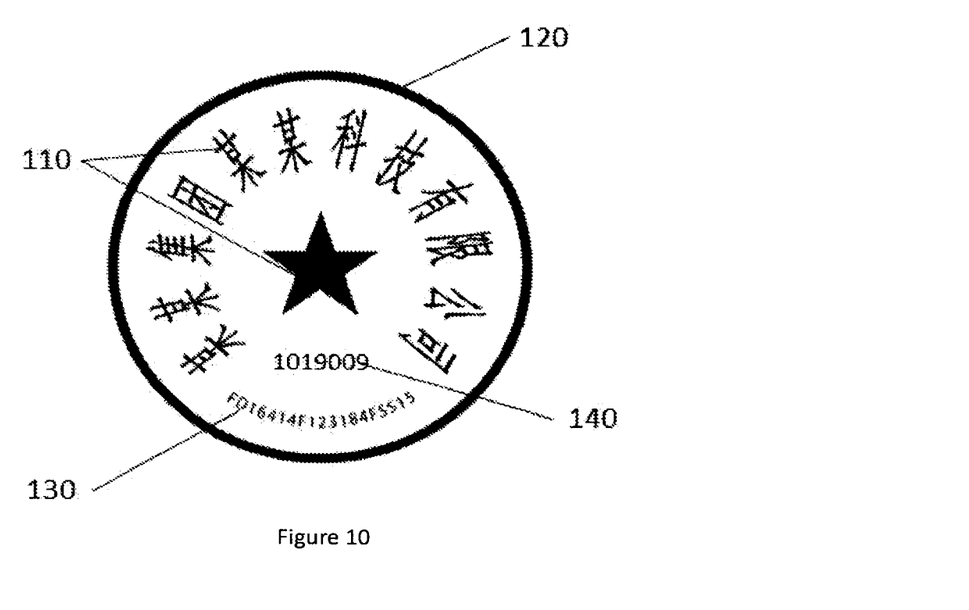
FIG. 10 is a schematic diagram of an encrypted seal in embodiment 3.

As shown in FIG. 10, a difference between embodiment 2 and the present embodiment lies in that the present embodiment adopts encrypted code of the bar-shaped digital encryption area 130 is a character string of combined digits and alphabets. In the present embodiment, stamped information of a stamped file is recorded in a character string of "FD16414F123184FSS15", and the double encryption comprises following steps of:

obtaining a character string to be processed, which comprises obtaining pixel information of the character string to be processed;

splitting the character string to be processed, which comprises randomly selecting a position on the character string to be processed as a split point, recording location information of the split point, wherein in the present embodiment, the split point randomly selected locates between a $10^{th}$ character "5" and a $11^{th}$ character "F", as shown in FIG. 4 and FIG. 5, the character string to be processed is split into a first fragment 131 and a second fragment 132, and two code fragments with missing information are formed, in which a front end of the first fragment 131 is "2", the first character of the character string, and a rear end of the second segment 132 is "1", the last character of the character string; and     re-splicing the two code fragments with missing information, as shown in FIG. 6, which comprises exchanging positions of the first fragment 131 and the second fragment 132, namely, splicing the last character of the second fragment 132 and the first character of the first fragment 131 to form a character string double encrypted.

Figure 11:
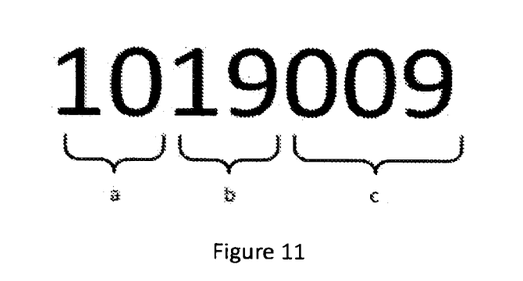
FIG. 11 is a schematic diagram of a check area in embodiment 3.

As shown in FIG. 11, in the present embodiment, the correction bit a indicating a total quantity of characters in the first segment 131, shows "10", the check bit b indicating a total quantity of characters of the character string to be processed, shows "19", and the encrypted seal is stamped for a $9^{th}$ time in the present embodiment, so the display bit c shows "009".

In addition, the "splitting the barcode or the character string to be processed" further comprises:

determining a position of the split point based on pixel information and location information of the split point; and     if the split point locates at a certain character of the character string, the character at which the split point locates is incorporated in to the first fragment 131 or into the second fragment 132.

Embodiment 4

Figure 9:
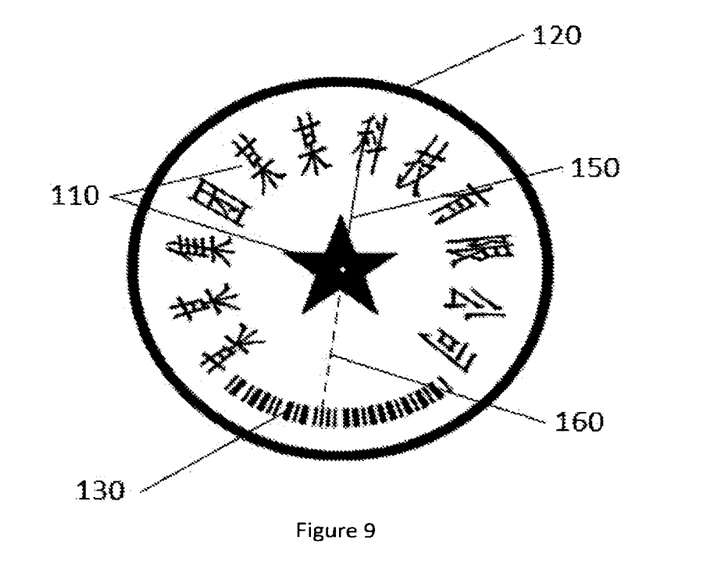
FIG. 9 is a schematic diagram of an encrypted seal in embodiment 4.

As shown in FIG. 9, differences between the present embodiment and embodiment 2 lie in that in the present embodiment no check area 140 is provided and when double encryption is performed, the split point is selected fixedly. In the present embodiment, a start symbol is preset at a bottom portion of radical "禾" of the character "科" in the graphic area of the seal, and then a position of a split point is determined based on the start symbol.

Specifically, the extension line 160 of a start symbol and seal center connection line 150 intersects the bar-shaped digital encryption area 130, and the intersection point of the extension line 160 and the bar-shaped digital encryption area 130 is used as the split point for splitting the bar-shaped code to be processed.

Embodiment 5

Figure 12:
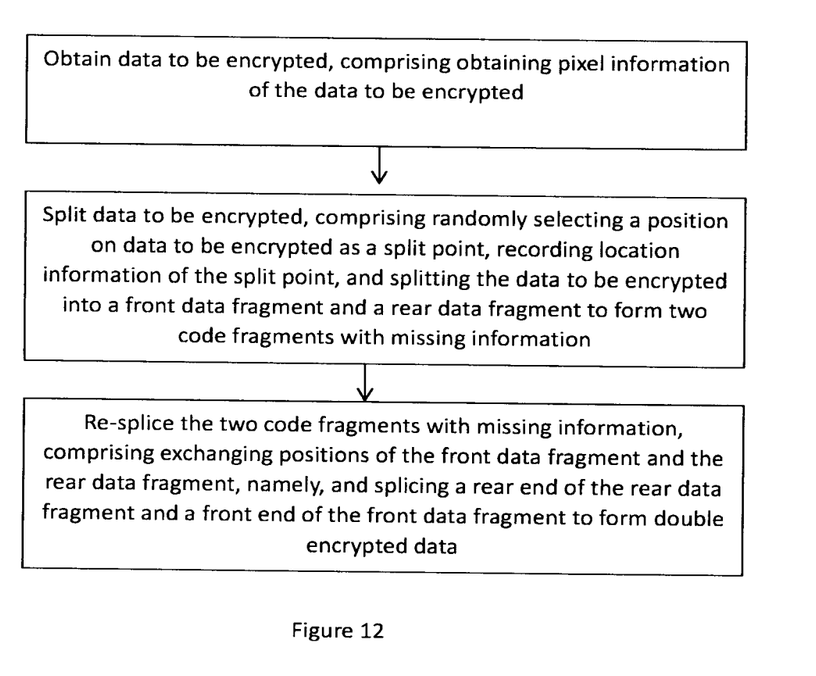
FIG. 12 shows a flowchart of a double encryption method of bar-shaped data in embodiment 5.

As shown in FIG. 12, the present embodiment provides a double encryption method of bar-shaped data, comprises:

obtaining data to be encrypted, which comprises obtaining pixel information of the data to be encrypted;

splitting the data to be encrypted, which comprises randomly selecting a position on the data to be encrypted as a split point, recording location information of the split point, splitting the data to be encrypted into a front data fragment and a rear data fragment to form two code fragments with missing information; and     re-splicing the two code fragments with missing information, which comprises exchanging positions of the front data fragment and the rear data fragment, namely, splicing a rear end of the rear data fragment with a front end of the front data fragment to form double encrypted data.

Specifically, the bar data comprises changeable and identifiable encrypted data formed by graphics, digits, alphabets, symbols or combinations thereof.

Embodiment 6

The present embodiment provides a digital file, and the digital file comprises any of the encrypted seals mentioned in above embodiments.

In the present embodiment, the digital file comprises but is not limited to electronic documents, contracts, bills, pictures, calligraphy and paintings, documents, certificates, instructions, user guides and product packaging.

In the description of this specification, terms like "front," "rear," "embodiment," "example," "specific example," or "some examples," etc., refer to specific methods, devices, or features described in conjunction with at least one embodiment or example of the present invention. In this specification, the illustrative expressions of the above terms are not necessarily directed to the same embodiment or example. Moreover, the specific features, methods, devices, or characteristics described may be combined in an appropriate manner in any one or more embodiments or examples. Furthermore, in non-contradictory situations, those skilled in the art may combine and integrate different embodiments or examples as well as features of different embodiments or examples described in this specification.

The above are only preferred embodiments of the present invention and are not intended to limit the present invention. Any modifications, equivalent substitutions, improvements, etc. made within the spirit and principles of the present invention shall be included in the protection scope of the present invention.

The invention claimed is:

1. A non-transitory readable storage medium, wherein a computer program is stored in the non-transitory readable storage medium, and the computer program when being executed by a computer, will have a processor of the computer execute an encrypted seal, comprising a graphic text area, a seal frame, and a bar-shaped digital encryption area, wherein both the graphic text area and the bar-shaped digital encryption area are arranged within the seal frame, inside the bar-shaped digital encryption area is filled an encrypted code, the encrypted code is generated when a stamping request is received, and information of a stamped file is loaded into the encryption code, the encrypted code records stamped information of the stamped file, different stamped files correspond to different encrypted codes, and the bar-shaped digital encryption area is arranged in a blank area between the graphic text area and the seal frame; and the encrypted code is arranged along the seal frame in an arc shape or a bar shape, and the stamped files comprise electronic or paper documents, contracts, bills, pictures, calligraphy and paintings, documents, certificates, instructions, user guides and product packaging;

wherein the encrypted code comprises a changeable and identifiable code formed by graphics, digits, alphabets, symbols or any combinations thereof;

wherein the encrypted code comprises a barcode or a character string double encrypted, which is used to perform double encryption on the encrypted seal;

wherein the barcode comprises a bar-shaped code or a combination of a bar-shaped code and any other encryption graphic, and the character string comprises digits, alphabets, or a combination of digits and alphabets;

wherein the double encryption comprises:

obtaining a barcode or a character string to be processed, which comprises obtaining pixel information of the barcode or the character string to be processed;

splitting the barcode or the character string to be processed, which comprises randomly or fixedly selecting a position on the barcode or the character string to be processed as a split point, recording location information of the split point, splitting the barcode or the character string to be processed into a first fragment and second fragment to form two code fragments with missing information, wherein a front end of the first fragment comprises a code head of the barcode or the character string to be processed, and a rear end of the second fragment comprises a code tail of the barcode or the character string to be processed; and re-splicing the two code fragments with missing information, which comprises exchanging positions of the first fragment and the second fragment, namely, splicing the rear end of the second fragment with the front end of the first fragment to form the barcode or the character string double encrypted.

2. The non-transitory readable storage medium according to claim 1, wherein the seal frame comprises round, oval and square shapes.

3. The non-transitory readable storage medium according to claim 1, wherein the split point is randomly selected.

4. The non-transitory readable storage medium according to claim 3, wherein within the seal frame is further provided a check area for setting encrypted information, the encrypted information comprises the location information of the split point, and the check area is set in a blank area within the seal frame.

5. The non-transitory readable storage medium according to claim 4, wherein the check area comprises a correction bit, a check bit and a display bit;

the correction bit is provided with the encrypted information, and the encrypted information comprises the location information of the split point, which is used to correct the barcode or the character string double encrypted;

the check bit is provided with verification information, which is used to check whether a length of the encrypted code is accurate; and the display bit is provided with information on a quantity of times of stamping, which is used to display how many times the encrypted seal has been stamped.

6. The non-transitory readable storage medium according to claim 3, wherein the encrypted code comprises a bar-shaped code or a combination of a bar-shaped code and any other encrypted graphics.

7. The non-transitory readable storage medium according to claim 6, wherein the step of splitting the barcode or the character string to be processed further comprises:

determining a position of the split point based on the pixel information and the location information of the split point;

if the split point locates at a vertical bar of the bar-shaped code, moving the split point to a first blank position behind or in front of the vertical bar, and splitting the barcode or the character string to be processed again, and adding a vertical bar to the front end of the second fragment or the rear end of the first fragment; and if the split point locates in a blank space of the bar-shaped code, directly splitting the barcode or the character string to be processed, and adding a vertical bar to the front end of the second fragment or the rear end of the first fragment.

8. The non-transitory readable storage medium according to claim 6, wherein the step of re-splicing the two code fragments with missing information further comprises:

setting a blank bar between the second fragment and the first fragment, wherein a width of the blank bar is an integer multiple of a narrowest blank width of the bar-shaped code, and does not exceed a width of a widest blank in the bar-shaped code; and then performing splicing again in an order of the second fragment, the blank bar, and the first fragment.

9. The non-transitory readable storage medium according to claim 3, wherein the encrypted code comprises a character string, and the character string comprises digits or alphabets or a combination of digits and alphabets.

10. The non-transitory readable storage medium according to claim 9, wherein the step of splitting the barcode or the character string to be processed further comprises:

determining a position of the split point based on the pixel information and the location information of the split point;

if the split point locates at a certain character of the character string, then incorporating the certain character of the character string at which the split point locates into the first fragment or into the second fragment; and if the split point locates in a blank space between two characters of the character string, directly splitting the barcode or the character string to be processed.

11. The non-transitory readable storage medium according to claim 1, wherein the split point is selected in a fixed manner.

12. The non-transitory readable storage medium according to claim 11, further comprising a start symbol, wherein the start symbol locates at a preset position.

13. The non-transitory readable storage medium according to claim 12, wherein an extension line of a start symbol and seal center connection line intersects the bar-shaped digital encryption area and an intersection point of the extension line and the bar-shaped digital encryption area is used as the split point.

14. The non-transitory readable storage medium according to claim 13, wherein the start symbol comprises characters or graphics in the graphic text area.

15. The non-transitory readable storage medium according to claim 13, wherein the start symbol comprises a preset point on the seal frame.

16. The non-transitory readable storage medium according to claim 1, wherein the encrypted code is arranged along the seal frame in any other shape which is convenient for identification.

17. The non-transitory readable storage medium according to claim 1, wherein the encrypted seal comprises one or a combination of red, blue, black and other various colors.

18. The non-transitory readable storage medium according to claim 1, wherein forms of the stamped files comprise electronic forms and material object forms.

19. The non-transitory readable storage medium according to claim 18, wherein the stamped files comprise electronic or paper documents, contracts, bills, pictures, calligraphy and paintings, documents, certificates, instructions, user guides and product packaging.

20. The non-transitory readable storage medium according to claim 18, wherein material object forms comprise outputting the encrypted seal to various physical objects such as paper materials, textile materials, leather materials, wooden materials, chemical materials, ceramic materials, metal materials, glass materials, etc.

21. A non-transitory readable storage medium, wherein a digital file is stored in the non-transitory readable storage medium, the digital file is readable by a computer processor, and the digital file comprising the encrypted seal according to claim 1.

22. The non-transitory readable storage medium according to claim 21, wherein the digital file comprises electronic documents, contracts, bills, pictures, calligraphy and paintings, documents, certificates, instructions, user guides and product packaging.

23. A non-transitory readable storage medium, wherein a computer program is stored in the non-transitory readable storage medium, and the computer program when being executed by a processor of the computer will have the processor of the computer execute a double encryption method of bar-shaped data, comprising:
  obtaining data to be encrypted, which comprises obtaining pixel information of the data to be encrypted;
  splitting the data to be encrypted, which comprises randomly or fixedly selecting a position on the data to be encrypted as a split point, recording location information of the split point, splitting the data to be encrypted into a front data fragment and a rear data fragment to form two code fragments with missing information; and
  re-splicing the two code fragments with missing information, which comprises exchanging positions of the front data fragment and the rear data fragment, namely, splicing a rear end of the rear data fragment with a front end of the front data fragment to form double encrypted data.

24. The non-transitory readable storage medium according to claim 23, wherein the bar data comprises changeable and identifiable encrypted data formed by graphics, digits, alphabets, symbols or combinations thereof.

* * * * *